(12) United States Patent
Marsico

(10) Patent No.: US 9,083,680 B2
(45) Date of Patent: Jul. 14, 2015

(54) SYSTEMS, METHODS, AND COMPUTER READABLE MEDIA FOR APPLICATION-LEVEL AUTHENTICATION OF MESSAGES IN A TELECOMMUNICATIONS NETWORK

(75) Inventor: Peter J. Marsico, Chapel Hill, NC (US)

(73) Assignee: TEKELEC, INC., Morrisville, NC (US)

( * ) Notice: Subject to any disclaimer, the term of this patent is extended or adjusted under 35 U.S.C. 154(b) by 1407 days.

(21) Appl. No.: 12/357,166

(22) Filed: Jan. 21, 2009

(65) Prior Publication Data

US 2009/0187759 A1    Jul. 23, 2009

Related U.S. Application Data

(60) Provisional application No. 61/022,076, filed on Jan. 18, 2008.

(51) Int. Cl.
*H04L 29/06*        (2006.01)

(52) U.S. Cl.
CPC ........ *H04L 63/0428* (2013.01); *H04L 63/0846* (2013.01)

(58) Field of Classification Search
CPC .................. H04L 29/12216; H04L 29/12311; H04L 61/2007; H04L 61/2084; H04L 63/0407
USPC ......... 713/152, 168, 170, 171, 172, 182, 183, 713/184, 185; 726/1, 2, 3, 4, 5, 6, 7, 8, 9, 726/26, 27, 28, 29, 30
See application file for complete search history.

(56) References Cited

U.S. PATENT DOCUMENTS 4,720,860 A    1/1988  Weiss
6,748,082 B1   6/2004  Vieweg et al.

(Continued)

FOREIGN PATENT DOCUMENTS

JP    2007-058469      3/2007
KR    10-2004-0083272  10/2004

(Continued)

OTHER PUBLICATIONS

Notification of Transmittal of the International Search Report and the Written Opinion of the International Searching Authority, or the Declaration for International Application No. PCT/US2009/031579 (Jul. 22, 2009).

(Continued)

*Primary Examiner* — Eleni Shiferaw
*Assistant Examiner* — Hilary Branske
(74) *Attorney, Agent, or Firm* — Jenkins, Wilson, Taylor & Hunt, P.A.

(57) ABSTRACT

Systems, methods, and computer readable media for application-level authentication in a telecommunications network are disclosed. According to one aspect, the subject matter described herein includes a method for application-level authentication of messages in a telecommunications network. The method includes, at a node in a telecommunications network, receiving, from a personal communications device having a user, a message requiring application-level authentication, the message including information associated with the user and incorporating first authentication information associated with the user, the first authentication information being provided from a source that is not the user of the personal communications device. A request for second authentication information associated with the user is sent to an authentication server. Second authentication information associated with the user is received from the authentication server, and the authenticity of the message is determined based on the second authentication information associated with the user.

35 Claims, 9 Drawing Sheets

(56) References Cited

U.S. PATENT DOCUMENTS

| | | |
|---|---|---|
| 7,076,657 B2 | 7/2006 | Koukoulidis et al. |
| 2003/0051041 A1* | 3/2003 | Kalavade et al. .............. 709/229 |
| 2003/0078058 A1* | 4/2003 | Vatanen et al. ............... 455/466 |
| 2003/0214970 A1* | 11/2003 | Pimentel ........................ 370/465 |
| 2003/0236981 A1 | 12/2003 | Marmigere et al. |
| 2004/0059952 A1 | 3/2004 | Newport et al. |
| 2005/0010758 A1 | 1/2005 | Landrock et al. |
| 2005/0015588 A1 | 1/2005 | Lin et al. |
| 2005/0135622 A1* | 6/2005 | Fors et al. ..................... 380/268 |
| 2005/0215231 A1 | 9/2005 | Bauchot et al. |
| 2005/0227669 A1* | 10/2005 | Haparnas ...................... 455/410 |
| 2006/0069914 A1 | 3/2006 | Rupp et al. |
| 2006/0069916 A1 | 3/2006 | Jenisch et al. |
| 2006/0098678 A1 | 5/2006 | Tan |
| 2006/0155653 A1* | 7/2006 | Persokrud et al. .............. 705/67 |
| 2007/0067828 A1 | 3/2007 | Bychkov |
| 2007/0101152 A1 | 5/2007 | Macredi et al. |
| 2007/0174904 A1 | 7/2007 | Park |
| 2007/0186115 A1* | 8/2007 | Gao et al. ....................... 713/184 |
| 2007/0234404 A1* | 10/2007 | Bogdanovic et al. ............. 726/3 |
| 2008/0085728 A1* | 4/2008 | Reding et al. .................. 455/466 |

FOREIGN PATENT DOCUMENTS

| | | | |
|---|---|---|---|
| WO | WO 03/015343 A1 | 2/2003 | |
| WO | WO 03/100544 A2 | 12/2003 | |
| WO | WO 2006045402 A1 * | 5/2006 | ............. H04L 29/06 |
| WO | WO 2009/092105 A2 | 7/2009 | |

OTHER PUBLICATIONS

Notification Concerning Transmittal of the International Preliminary Report on Patentability for International Patent Application No. PCT/US2009/031579 (Jul. 29, 2010).

Ng, "Short Message Service (SMS) Security Solution for Mobile Devices," Naval Postgraduate School Thesis (Dec. 2006).

M'Raihi et al., "HOTP: An HMAC-Based One-Time Password Algorithm," Network Working Group, RFC 4226 (Dec. 2005).

\* cited by examiner

SYSTEMS, METHODS, AND COMPUTER READABLE MEDIA FOR APPLICATION-LEVEL AUTHENTICATION OF MESSAGES IN A TELECOMMUNICATIONS NETWORK

PRIORITY CLAIM

This application claims the benefit of U.S. Provisional Patent Application Ser. No. 61/022,076, filed Jan. 18, 2008; the disclosure of which is incorporated herein by reference in its entirety.

TECHNICAL FIELD

The subject matter described herein relates to application-level authentication in a telecommunications network. More particularly, the subject matter described herein relates to systems, methods, and computer readable media for application-level authentication of messages in a telecommunications network.

BACKGROUND

Users of telecommunications networks increasingly desire to use a cell phone or other personal communications device to make on-line purchases, perform banking or other transactions, redeem coupons or use gift cards during in-store transactions, and a wide variety of other activities that may benefit from, or even require, authentication of the identity of the person seeking to perform the transaction. Short messaging service (SMS) messages are an increasingly popular mechanism for performing transactions using a personal communications device, but there is no defined standard for authentication of SMS messages. Wireless network protocols such as GSM include some level of authentication, but many wired network protocols do not. Furthermore, wireless network authentication is limited to the network, transport, or session layer of a typical network protocol stack. While this level of authentication is useful to verify that the user's cell phone is allowed access onto the wireless network, it does not address the need to verify to a bank, for example, that the person using the cell phone to transfer money out of an account is the actual owner of that account.

Consequently, messages that originate from or transfer into wired networks may not be authenticated or may have authentication that is insufficient for the task at hand. Moreover, the problem is not limited to SMS messages. Other types of messages that are sent through a telecommunications network may require or benefit from authentication. For example, networked games, such as massively multiplayer role-playing games, involve communication of messages back and forth between a player and the game server. In some games, the play involves a form of commerce in the game currency, such as where players buy and sell virtual property. Thus, for both real and virtual commerce, for example, it becomes vitally important that there be authentication of messages at the application level. Without application level authentication, these transactions pose a security risk, and present opportunities for fraudulent transactions to be performed.

Accordingly, there exists a need for application-level authentication of messages in a telecommunications network.

SUMMARY

According to one aspect, the subject matter described herein includes a method for application-level authentication of messages in a telecommunications network. The method includes, at a node in a telecommunications network, receiving, from a personal communications device having a user, a message requiring application-level authentication, the message including information associated with the user and incorporating first authentication information associated with the user, the first authentication information being provided from a source that is not the user of the personal communications device. A request for second authentication information associated with the user is sent to an authentication server. Second authentication information associated with the user is received from the authentication server, and the authenticity of the message is determined based on the second authentication information associated with the user.

As used herein, the term "application-level authentication" refers to authentication that is performed at the application level or equivalent of a network protocol stack, and specifically excludes authentication that occurs at levels below the application level in a network protocol stack, such as the physical, data link, network, transport, session, or presentation layers of the Open Systems Interconnection (OSI) network protocol stack or equivalent.

As used herein, the term "authentication information" refers to information that is used to authenticate the identity of the sender of a message.

As used herein, the term "authentication server" refers to an entity, such as an application server or other node on a network, that provides an authentication service, usually in response to receiving a request for authentication from an authentication client or other entity requesting authentication from the authentication server. The authentication server may perform the authentication itself, or it may provide to the requesting entity information that the requesting entity may use to perform the authentication.

According to another aspect, the subject matter described herein includes a method for application-level authentication of messages in a telecommunications network. The method includes, at a personal communications device for communicating with a telecommunications network, receiving, from an authentication information source that is not a user of the personal communications device, authentication information associated with a sender of a message, and sending a message requiring application-level authentication, the message incorporating the authentication information.

As used herein, the term "personal communications device" refers to any device by which a user may communicate with another entity. Example personal communication devices include cell phones, mobile phones, pagers, personal digital assistants (PDAs), etc.

As used herein, the term "authentication information source" refers to any source of authentication information, and the term "authentication information providing entity" refers to any provider of authentication information.

According to yet another aspect, the subject matter described herein includes a system for application-level authentication in a telecommunications network. The system includes a personal communications device configured for sending a message requiring application-level authentication in a telecommunications network, the message including information associated with a sender of the message and incorporating first authentication information associated with the sender of the message, the first authentication information being provided from a source that is not the user of the personal communications device. The system also includes a node in the telecommunications network configured for receiving the message requiring application-level authentication, and, in response to receiving the message, for sending a request for second authentication information associated with the sender. The system also includes an authentication server for receiving the request for second authentication information associated with the sender, and, in response to receiving the request, providing, to the node, the second authentication information associated with the sender. The node, upon receiving the second authentication information, determines the authenticity of the message requiring application-level authentication based on the second authentication information.

According to yet another aspect, the subject matter described herein includes an apparatus for performing application-level authentication. The apparatus includes an authentication information module for providing authentication information and a personal communications device, locally communicatively coupled with the authentication information module, for communicating with a telecommunications network and for receiving authentication information from the authentication information module, generating a message requiring application-level authentication and incorporating the authentication information, and sending the generated message.

As used herein, an entity is "communicatively coupled" to another if the entities can communicate messages, data, or other information to and from each other. As used herein, an entity is "locally communicatively coupled" to another if the two entities that are communicatively coupled to each other are in close proximity to each other.

The subject matter described herein for application-level authentication of messages in a telecommunications network may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer perform steps.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

As used herein, the terms "gaming server", "on-line gaming server", "multiplayer networked game server", and "interactive gaming application" collectively refer to entities that provide access to a game or gaming program. A gaming server may provide gaming services to one or more local gaming clients. An on-line gaming server may provide gaming services to local and/or remote gaming clients. A multiplayer networked game server may provide gaming clients access to a multiplayer networked game, which may be distributed across multiple game servers, for example. An interactive gaming application may be a game application that does not use the client/server type of communication.

As used herein, the term "instant messaging service message" refers to any message sent using a form of real-time communication between two or more people, which may be based on typed text (e.g., short message service, or SMS) and which may involve transmission of media streams (e.g., multimedia messaging service, or MMS), and conveyed via devices connected over a telecommunications network, such as the Internet or mobile communications networks.

As used herein, the term "encryption key" refers to one input of an encryption algorithm used to encrypt or decrypt data. As used herein, the term "encryption parameter" refers generally to any aspect of the encryption algorithm that may be changed, including not only the encryption key value but also the encryption key length, the input block length, the encryption method (such as electronic code book, output block chaining, and cipher block chaining), number or rounds or operations performed, and so on.

As used herein, the term "short code" refers to telephone numbers, significantly shorter than full telephone numbers, which can also be used to address SMS messages from mobile phones or fixed phones.

As used herein, the term "fob" refers to a physical device that is locally communicatively coupled to another physical device. The fob may be physically connected to and disconnected from the other device in order to effect communication between the two devices, or the fob may communicate to the other device wirelessly with the other device, usually when the two devices are in close proximity to each other.

As used herein, the terms "network provider" and "network carrier" refer to an entity, such as a business entity, that provides access to a telecommunications network or that provides and maintains at least some portion of the telecommunications network.

As used herein, the term "application" refers to a program, module, functional routine, applet, or other entity that may be implemented in hardware, software, firmware, or any combination thereof. As used herein, the term "application provider" refers to an entity that provides or otherwise makes available an application.

BRIEF DESCRIPTION OF THE DRAWINGS

Preferred embodiments of the subject matter described herein will now be explained with reference to the accompanying drawings, wherein like reference numerals indicate like parts, of which.

DETAILED DESCRIPTION

Figure 1:
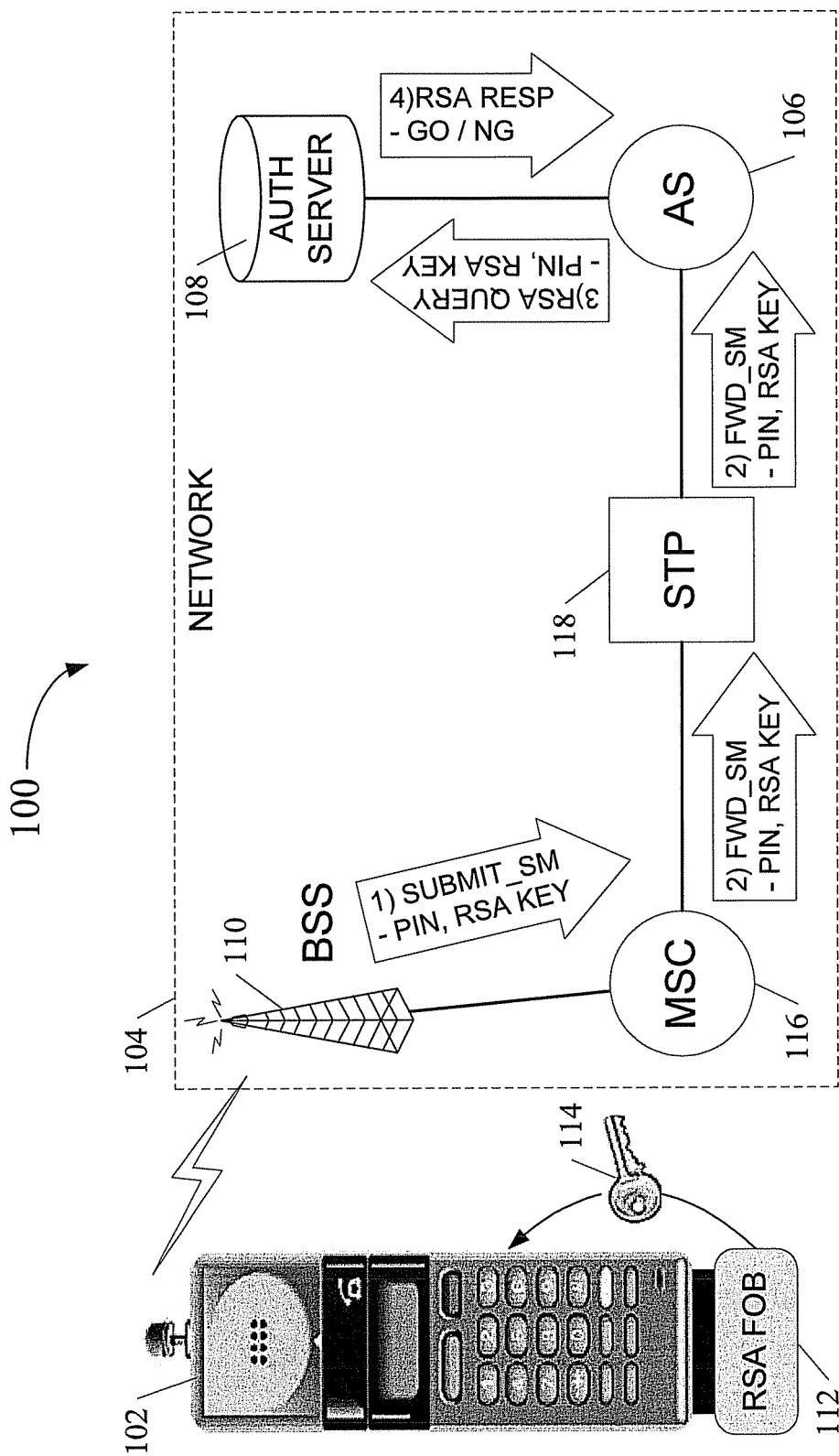
FIG. 1 is a block diagram illustrating an exemplary system for application-level authentication in a telecommunications network according to an embodiment of the subject matter described herein.

In accordance with the subject matter disclosed herein, systems, methods, and computer readable media are provided for application-level authentication in a telecommunications network. FIG. 1 is a block diagram illustrating an exemplary system for application-level authentication in a telecommunications network according to an embodiment of the subject matter described herein.

Referring to FIG. 1, a system for application-level authentication 100 includes a personal communications device 102 configured for sending a message requiring application-level authentication in a telecommunications network 104. The message includes information associated with a sender of the message, such as information identifying the sender of the message. The message also includes first authentication information associated with the sender of the message. For example, the message may include a username and password, a user account number and personal identification number (PIN), and the like. System 100 may include an authentication-requesting node 106 for receiving the message, and, in response to receiving the message, for sending a request for second authentication information associated with the sender. System 100 may include an authentication server 108 for receiving the request for second authentication information associated with the sender, and, in response to receiving the request, providing the second authentication information to the authentication-requesting node 106. Upon receiving the second authentication information, node 106 may determine the authenticity of the message requiring application-level authentication based on the second authentication information. The operation of system 100 is described in more detail in FIG. 3, below.

Device 102 may be a mobile communications device, such as a cell phone, a personal digital assistant (PDA), or a mobile communicating device/platform, for communicating with network 104 via an air interface 110, such as a base station subsystem (BSS) of a GSM network.

The message requiring application-level authentication may take many forms. For example, the message may be a short message service (SMS) message, an unstructured supplementary service data (USSD) message, a multimedia messaging service message, a SIP messaging service message, an instant message, or an application-specific message, such as a hypertext markup language (HTML) message, an extended markup language (XML), or a simple object application protocol (SOAP) message. The message may include a request for a particular service or for a particular transaction. In one example, the message may be a request for a banking transaction, such as a commercial transaction or a request to transfer money to or from a bank account. In another example, the message may contain information conveyed between an on-line gamer and a networked gaming application. For communications utilizing a stateless protocol, each message may require its own authentication. The message may contain text, binary data, or both.

The information associated with the sender of the message requiring application-level authentication may include a personal identifier number (PIN), a username, an international mobile subscriber identity (IMSI), a mobile subscriber ISDN (MSISDN) identifier, a mobile identification number (MIN), a uniform resource identifier (URI), and a directory number associated with the sender, or other information that may be used to identify the sender of the message, including message parameters, such as calling party number.

The first and second authentication information associated with the sender may include a PIN, a password, a one-time password (OTP), an encryption key, an encryption parameter, or other information useful for authenticating a sender of a message.

In one embodiment, the first authentication information may be provided to device 102 by an authentication information providing entity that is locally and communicatively coupled to device 102, such as a security fob 112 that is physically connected to device 102 or connected to device 102 via Bluetooth, infra-red, near-field communication (NFC) or other wireless connection. For example, security fob 112 may provide to device 102 an encryption key 114 that may be used, for example, to decrypt or encrypt messages sent to or from device 102.

In an alternate embodiment, the first authentication information may be provided by a network entity for providing the first authentication information in response to requests for authentication information. For example, the first authentication information may be provided by authentication server 108 in response to a request from device 102 for the first authentication information.

In another alternate embodiment, the first authentication information may be entered by the user of device 102. For example, a user of device 102 who wants to send a message may enter a personal identification number or password via a keypad on the device.

In the embodiment illustrated in FIG. 1, authentication-requesting node 106 is an application server (AS). In alternate embodiments, the request for authentication information associated with the sender may be issued by other nodes in system 100. For example, the request for authentication information may come from a session initiation protocol (SIP) application server, a service control point (SCP), a home location register (HLR), a visitor location register (VLR), a gaming server, an on-line gaming server, a multiplayer networked game server, an interactive gaming application, or any other network entity for providing a service or performing a transaction in response to receiving a service or transaction request. The request for authentication information may come from a gateway 116, such as a mobile switching center (MSC) or a service switching point (SSP), a signal routing node 118, such as a signal transfer point (STP), a call session control function (CSCF) node, an Internet protocol multimedia subsystem (IMS) node, or other network entity that processes and routes network messages.

The request for authentication information, hereinafter referred to as an authentication query, may be characterized as being "triggered" or "triggerless". An authentication query is said to be "triggered" if the query is sent in response to a specific request to perform the query. In contrast, an authentication query is said to be "triggerless" if the query is sent as a result of a determination, in the absence of a specific request to authenticate, that a received message is of a type that requires application-level authentication. Signaling message routing nodes and gateways are logical candidates to perform triggerless application-level authentication, while application servers or other nodes providing a service are logical candidates for performing triggered application-level authentication.

Figure 2:
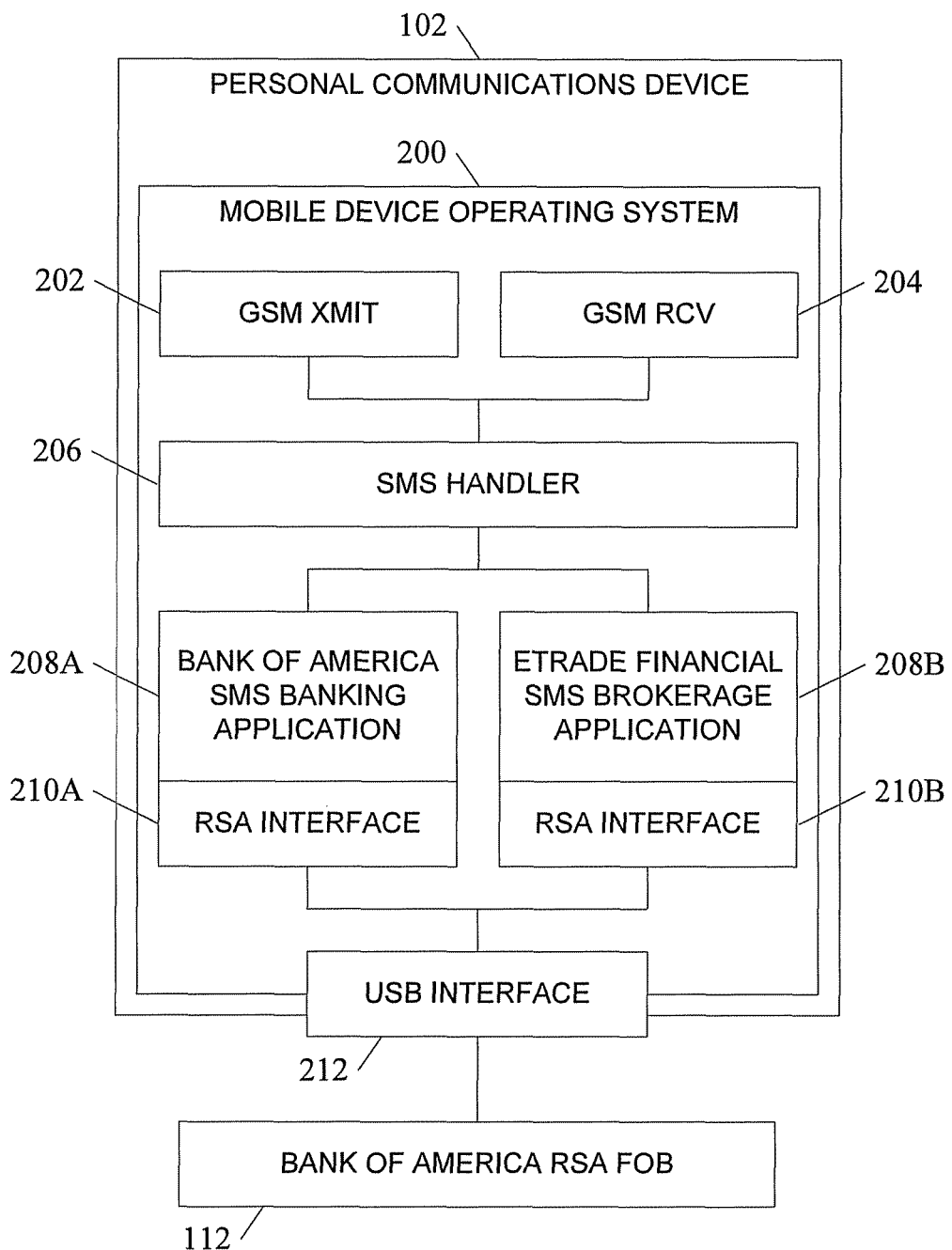
FIG. 2 is a block diagram illustrating in more detail an exemplary personal communications device according to another embodiment of the subject matter described herein.

FIG. 2 is a block diagram illustrating in more detail an exemplary personal communications device according to an embodiment of the subject matter described herein. In one embodiment, device 102 may include a mobile operating system (mobile OS 200) for managing the hardware subsystems within device 102 and for hosting software subsystems, including applications, communication protocol stacks, user interfaces, etc. Specifically, mobile OS 200 may include an interface to the GSM transmitter subsystem 202 and GSM receiver subsystem 204, passing SMS messages to and from SMS handler 206, which provides SMS messaging capability to on-board applications. In one embodiment, device 102 may include one or more applications 208, such as a banking application 208A and a brokerage application 208B. Each application may have an interface 210 to an encryption module, application programming interface (API), or application binary interface (ABI), for providing encryption services to the applications. Here, banking application 208A and brokerage application 208B each have an RSA interface, RSA interface 210A and RSA interface 210B, respectively. The RSA interfaces 210 communicate with fob 112 via a communication interface 212. In one embodiment, communication interface 212 may be a wired interface, such as a USB interface. In alternative embodiments, communication interface 212 may be a wireless interface, such as a Bluetooth interface.

In the embodiment illustrated in FIG. 2, fob 112 is an RSA fob provided by the provider of banking application 208A, and thus may communicate only with banking application 208A. In one alternate embodiment, a single fob 112 may operate with all applications. In other alternate embodiments, a separate fob 112 may be required for each application 208, for each application provider, for each user, and/or for each device 102.

In one embodiment, the authentication information may be generated using an algorithm that uses various types of information as some form of input, such as seed data, parameter data, encryption keys, etc., into the algorithm. The information that may be used as input into the algorithm may include information associated with the sender of the generated message, the authentication information module, and/or the personal communications device. The information may include the time that the message is generated, the date on which the message is generated, the geographic location of the personal communications device, and/or the network with which the personal communications device is communicating. The information may include information about the provider of an application existing on the personal communications device, and may include information provided by the sender of the message at the time that the message is generated.

Figure 3:
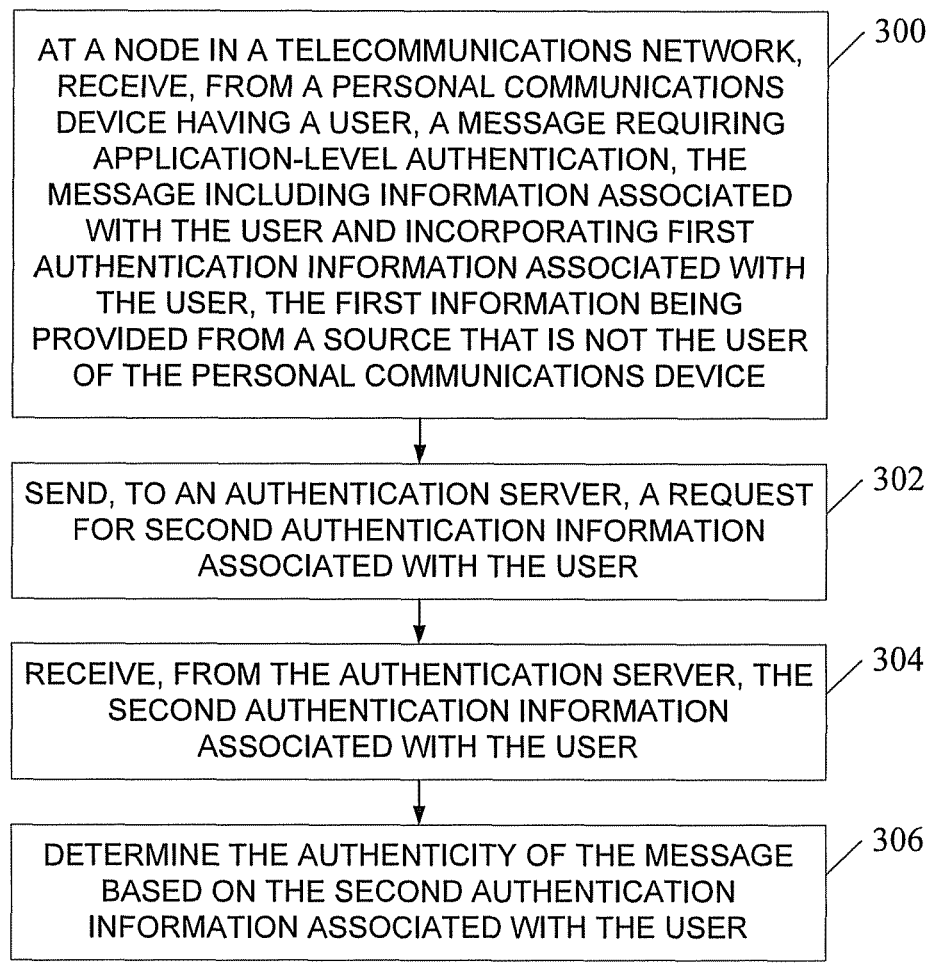
FIG. 3 is a flow chart illustrating an exemplary process for application-level authentication in a telecommunications network according to yet another embodiment of the subject matter described herein.

FIG. 3 is a flow chart illustrating an exemplary process for application-level authentication in a telecommunications network according to an embodiment of the subject matter described herein. Referring to FIG. 3, in block 300, a message sent from a personal communications device having a user and requiring application-level authentication is received at a node in a telecommunication network, the message including information associated with the user and incorporating first authentication information associated with the user, the first authentication information being provided from a source that is not the user of the personal communications device. For example, node 106 may receive an SMS message, sent by a user of a wireless communication device 102, requesting a transfer of money from one bank account to another bank account. The message may enter network 104 via the closest air interface 110 and be sent (FIG. 1, message 1) to its associated gateway 116. The message (FIG. 1, message 2) may then be routed through signal routing node 118 on its way to node 106, which may be an application server for user's bank, for example. The SMS message may include the user's name or the telephone number of the user's device 102, which may be used to determine the identity of the user.

The message may incorporate the first authentication information in a variety of ways. For example, some or all of the first authentication information may be included in the message payload. In the scenario described above, the request for a banking transaction may include the user's personal information number (PIN) or password, which may be used to authenticate the user's identity. Some or all of the first authentication information may be used to modify, compress, or encrypt some portion of the message or message payload. For example, the first authentication information may include an encryption key or encryption parameter, which device 102 may use to encrypt the all or some portion of the message or message payload.

The first authentication information may be provided to device 102 by a authentication information provisioning module. In one embodiment, the authentication information provisioning module may be a locally communicatively coupled device, such as fob 112. For example, fob 112 may provide a one-time password, or OTP 114, to device 102 upon request. Fob 112 may be connected to device 102 physically, such as via a USB or other bus or serial connection, or via a wireless link, such as an infra-red connection (e.g., IRDA®), a near-field communications (NFC) connection, or a radio-frequency connection such as a BLUETOOTH® connection.

In an alternate embodiment, the authentication information provisioning module may be a network entity, such as authentication server 108. For example, prior to sending the message requiring authentication, device 102 may request a one-time password from authentication server 108. In one embodiment, device 102 may request the first authentication information (e.g., the OTP) by sending an SMS message to a short code. For example, device 102 may send an SMS message to "SC=100", where "100" is the short code for authentication server 108. Device 102 may receive the one-time password from authentication server 108 and incorporate it into the message requiring authentication. The message requiring authentication is then sent to node 106.

At block 302, a request for second authentication information associated with the user is sent to an authentication server; at block 304, the second authentication information associated with the user is received from the authentication server; and at block 306, the authenticity of the message is determined based on the second authentication information. These operations will now be described in more detail.

In one embodiment, node 106 may send an authentication request to authentication server 108, where the request for authentication includes both the information associated with the user and the first authentication information associated with the user (FIG. 1, message 3). In this embodiment, node 106 is essentially asking authentication server 108 to perform the authentication and inform node 106 of the results. Using the banking example above, node 106 may send to authentication server 108 an authentication request that includes the identity of the user and the one-time password provided to device 102 by fob 112. The user may be identified by a variety of means, including by PIN, username, international mobile subscriber identity (IMSI) number, mobile subscriber ISDN (MSISDN) number, mobile identification number (MIN), uniform resource identifier (URI), directory number (DN), and so on. Authentication server 108 may perform the authentication step by using the user's ID to perform a lookup in a table, database, or other data store to find second authentication information associated with the user, and then determine whether the message can be authenticated based on a comparison of the first authentication information to the second authentication information. For example, node 106 may receive a message that includes the user's PIN. Node 106 may extract the PIN and MSISDN number from the message and include them in an authentication request to authentication server 108. Authentication server 108 may use the MSISDN number to look up the user's PIN from its database. If the PIN from the database matches the PIN sent from the user, authentication server 108 may return an "authentication successful" message to node 106; otherwise, authentication server 108 may return an "authentication failed" message to node 106 (FIG. 1, message 4).

In an alternate embodiment, node 106 may request authentication information from authentication server 108, which node 106 may then use to make its own authentication determination. For example, node 106 may send to authentication server 108 a request for authentication information, the request including information identifying the user. Since node 106 is making the determination of authenticity, the request for authentication information need not include the first authentication information associated with the user. Authentication server 108 may use the information associated with or identifying the user to perform a lookup as described above to determine the second authentication information associated with the user. Authentication server 108 may then send the second authentication information to node 106. In this embodiment, node 106, rather than authentication server 108, may compare the first and second authentication information and make a determination of authenticity based on that comparison.

Although the authentication steps described above illustrate authentication interactions between node 106 and authentication server 108, the scope of the subject matter described herein is not so limited: the same interactions may occur between another network entity and authentication server 108. As stated above, a request for authentication (or a request for authentication information) may be generated triggerlessly, in which case the authentication steps described above with respect to node 106 and authentication server 108 may be performed by signal routing node 118 and authentication server 108, or by gateway 116 and authentication server 108, for example.

Figure 4:
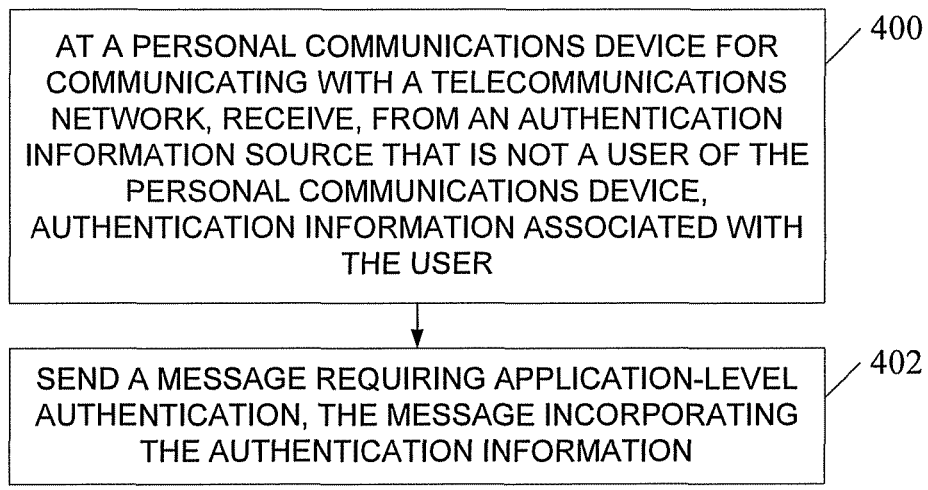
FIG. 4 is a flow chart illustrating an exemplary process for application-level authentication in a telecommunications network according to yet another embodiment of the subject matter described herein.

FIG. 4 is a flow chart illustrating an exemplary process for application-level authentication in a telecommunications network according to another embodiment of the subject matter described herein. This flow chart illustrates the process from the perspective of a personal communications device. Referring to FIG. 4, in block 400, at a personal communications device for communicating with a telecommunications network, authentication information associated with a user of the personal communications device is received, the authentication information being provided from an authentication information source that is not the user of the personal communications device. At block 402, the personal communications device sends a message requiring application-level authentication, the message incorporating the received authentication information.

As described above, the authentication information may be provided to device 102 by the user (e.g., by entering data via a key pad, touch screen, microphone, etc.), by a locally communicatively coupled device, such as fob 112, by a network entity, such as authentication server 108, or some combination of the above. In one embodiment, fob 112 continually generates a series of one time passwords, generating a new OTP periodically, such as every 30, 60, or 120 seconds, for example. Once the new OTP is generated, the previous OTP is considered to have expired and can no longer be used for authentication purposes. In one embodiment, fob 112 may generate the OTPs in a pseudo-random sequence, using a linear feedback shift register (LFSR) in hardware or an equivalent function in software. The pseudo-random sequence for each fob is duplicated at authentication server 108. In these embodiments, the fobs are typically synchronized with the server prior to being distributed to the users, and from the point of synchronization, the fob and server will generate the same pseudo-random sequence of OTPs. The server typically maintains separate LFSRs or equivalent for each fob. The OTP sequence for one fob may be distinct from the OTP sequence for another fob, based on the seed, or initial value, programmed into the LFSRs of the fob and server at the time of synchronization.

In these embodiments, a new OTP is generated periodically, and the old OTP expired, whether or not the OTP is used; fob 112 will send the value of the current OTP to device 102 whenever the device 102 requests an OTP. Once device 102 receives the current OTP, device 102 has only a limited time during which the OTP remains valid. If the message requiring authentication does not arrive at node 106 with enough time for node 106 to and authentication server 108 to perform the authentication before the period of validity (e.g., 60 seconds) expires, the message cannot be authenticated. This constraint makes "man in the middle" attacks, in which a malicious party intercepts the message from device 102, breaks the encryption, decodes the message, and recodes the message using the malicious party's authentication information before sending it on to the destination node 106, extremely difficult due to the very limited time in which to perform the above-mentioned steps before the OTP expires.

In an alternate embodiment, fob 112 may contain a large number of one time passwords in a true random sequence, where each OTP can be used only once. For example, fob 112 may be a large secure flash memory, programmed to provide device 102 the next available OTP value, after which that entry in memory is cleared or otherwise obfuscated. In these embodiments, authentication server 108 may store a duplicate copy of the list of OTPs for each fob. When a message requiring authentication is received by authentication server 108, it may retrieve the next available OTP from its list for the user's fob 112, and perform the authentication steps as described above.

Figure 5:
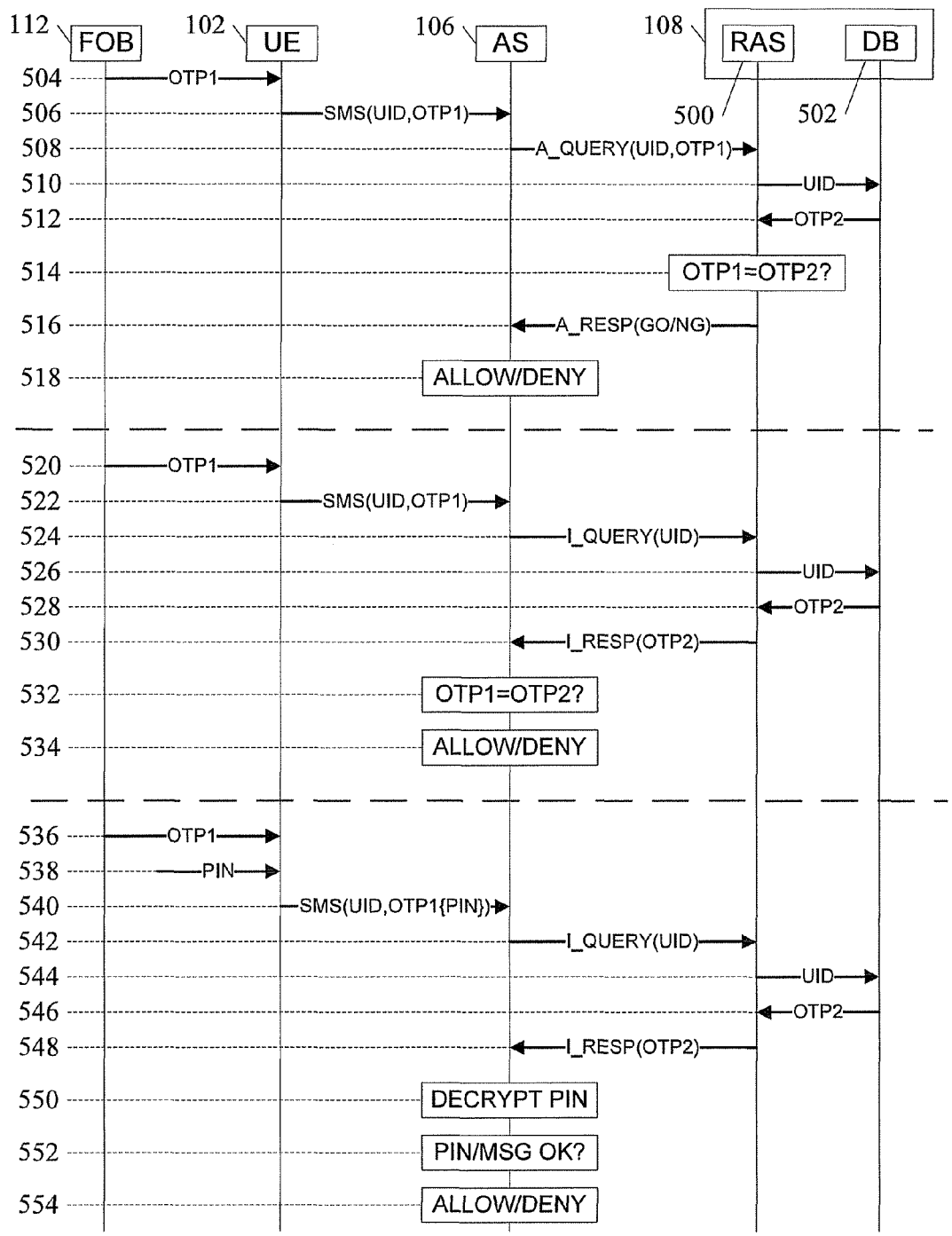
FIG. 5 is a signaling message flow diagram illustrating messages communicated during an exemplary process for application-level authentication in a telecommunications network according to yet another embodiment of the subject matter described herein.

FIG. 5 is a signaling message flow diagram illustrating messages communicated during an exemplary process for application-level authentication in a telecommunications network according to an embodiment of the subject matter described herein. For simplicity, only the following entities are shown in the signaling message flow diagram: fob 112, device 102, node 106, and authentication server 108. Intermediate nodes, such as signal routing nodes and gateways, are not shown.

In one embodiment, authentication server 108 may include an RSA authentication server RAS 500, for receiving authentication queries or authentication information queries, indicated on FIG. 5 as "A_QUERY" and "I_QUERY", respectively, and for returning authentication responses or authentication information responses, indicated on FIG. 5 as "A_RESP" and "I_RESP", respectively. Authentication server 108 may store its authentication information in an authentication database DB 502, which may be a table, a database, a data structure, a memory, or other form of data store, including combinations of the above.

The authentication operations described in blocks 302, 304, and 306 of FIG. 3 may be implemented in various ways.

Three different variations are illustrated in FIG. 5, and will now be described in turn. In FIG. 5, the first authentication information is provided by a locally communicatively coupled authentication information providing entity, such as fob 112.

In one embodiment, authentication server 108 performs the authentication operation and returns the result to the node that requested authentication, which in this example is node 106. Referring to FIG. 5, in message 504, fob 112 sends a first authentication information associated with a sender to device 102. In this example, the first authentication information is a one time password OTP1. This information may be sent from fob 112 to device 102 in response to a request from device 102, such as in preparation for sending an SMS or USSD message that requires authorization. Device 102 creates the SMS message 506, which includes information associated with the user, such as information identifying the user (UID), and the first authentication information associated with the user (OTP1). For the purposes of illustration, message 506 may be a request to perform a brokerage operation involving shares owned by the sender of the message.

Message 506 is received by node 106, which extracts the UID and OTP1 and sends an authentication query (A_QUERY) message 508, including the extracted UID and OTP1, to authentication server 108. Within authentication server 108, RAS 500 receives the A_QUERY and may query DB 502 (message 510) to determine if there is any authentication information associated with the user identified by UID. RAS 500 may receive a response from DB 502 (message 512) containing second authentication information (OTP2) associated with the sender.

Authentication server 108 may determine the authenticity of the message requiring authentication (message 506) based on the relationship between the first and second authentication information. For example, authentication server 108 may compare OTP1 and OTP2 (block 514), and if they are the same, authentication server 108 may determine that message 506 is authentic. Authentication server 108 may then send to node 106 an authentication response message, such as A_RESP message 516, to indicate whether the authentication was successful or not successful-e.g., a "go" or a "no-go" (GO/NG). Based on the authentication response message 516, node 106 may choose to allow or deny the brokerage transaction (block 518). For example, node 106 may allow the transaction if the A_RESP message indicated a "GO" and deny the transaction if the A_RESP message indicated a "NG".

In another embodiment, authentication server 108 provides authentication information to node 106, and node 106 performs the authentication operation. Referring again to FIG. 5, the descriptions of messages 520 and 522 are the same as for messages 504 and 506, respectively, and will not be repeated herein. Message 522 is received by node 106, which extracts the UID information and sends an authentication information query (I_QUERY) message 524, including the extracted UID, to authentication server 108. The descriptions of messages 526 and 528 are the same as for messages 510 and 512, respectively, and will not be repeated herein. If RAS 500 receives second authentication information, e.g., OTP2, from DB 502, authentication server 108 may send an authentication information response (I_RESP) message 530 to node 106.

Node 106 may determine the authenticity of the message requiring authentication (message 522) based on the relationship between the first and second authentication information. For example, node 106 may compare OTP1 and OTP2, and if they are the same, node 106 may determine that message 522 is authentic (block 532) and subsequently allow or deny the transaction (block 534).

In yet another embodiment, the first authentication information is used to encrypt the payload of the message requiring authentication. In this example, the payload of the message includes private information, such as the user's PIN. The description for message 536 is the same as for message 504, and will not be repeated herein. In preparation for a financial transaction, a user may be required to provide additional identifying information. For example, an application 208 may prompt the user to enter the user's PIN. This operation is illustrated in message 538. In one embodiment, the first authentication information, e.g., OTP1, may be an encryption key used by an encryption algorithm to encrypt all or part of the message payload. In this example, the user's PIN is encrypted using OTP1 as a key, as indicated by the notation "OTP1{PIN}", and sent as part of an SMS message 540. As in examples above, SMS message 540 also includes information associated with a user, such as information identifying a user UID.

The descriptions of messages 542, 544, 546, and 548, are the same as for messages 524, 526, 528, and 530, respectively, and will not be repeated herein. If node 106 receives an I_RESP from authentication server 108 that includes second authentication information (OTP2), authentication server 108 may use OTP2 to decrypt the encrypted portion of the message payload (block 550), determine whether the decrypted PIN is correct and/or whether the decrypted message is a valid message (block 552), and, based on that determination, allow or deny the transaction (block 554).

In an alternate embodiment, upon receiving encrypted message 540, node 106 may send an A_QUERY message including UID and encrypted payload OTP1{PIN} to RAS 500, which uses UID to retrieve OTP2 from DB 502. RAS 500 may then use OTP to decrypt the encrypted payload, verify that the PIN and/or message is valid, and issue an A_RESP message to node 106. Node 106 may then allow or deny the transaction. In one embodiment, the transaction itself is also encrypted, in which case the A_RESP message from RAS 500 to node 106 may either include OTP2, which node 106 may then use to decrypt the transaction itself, or include the decrypted transaction, which node 106 may execute or not depending on whether RAS 500 returned a GO or NG result.

Figure 6:
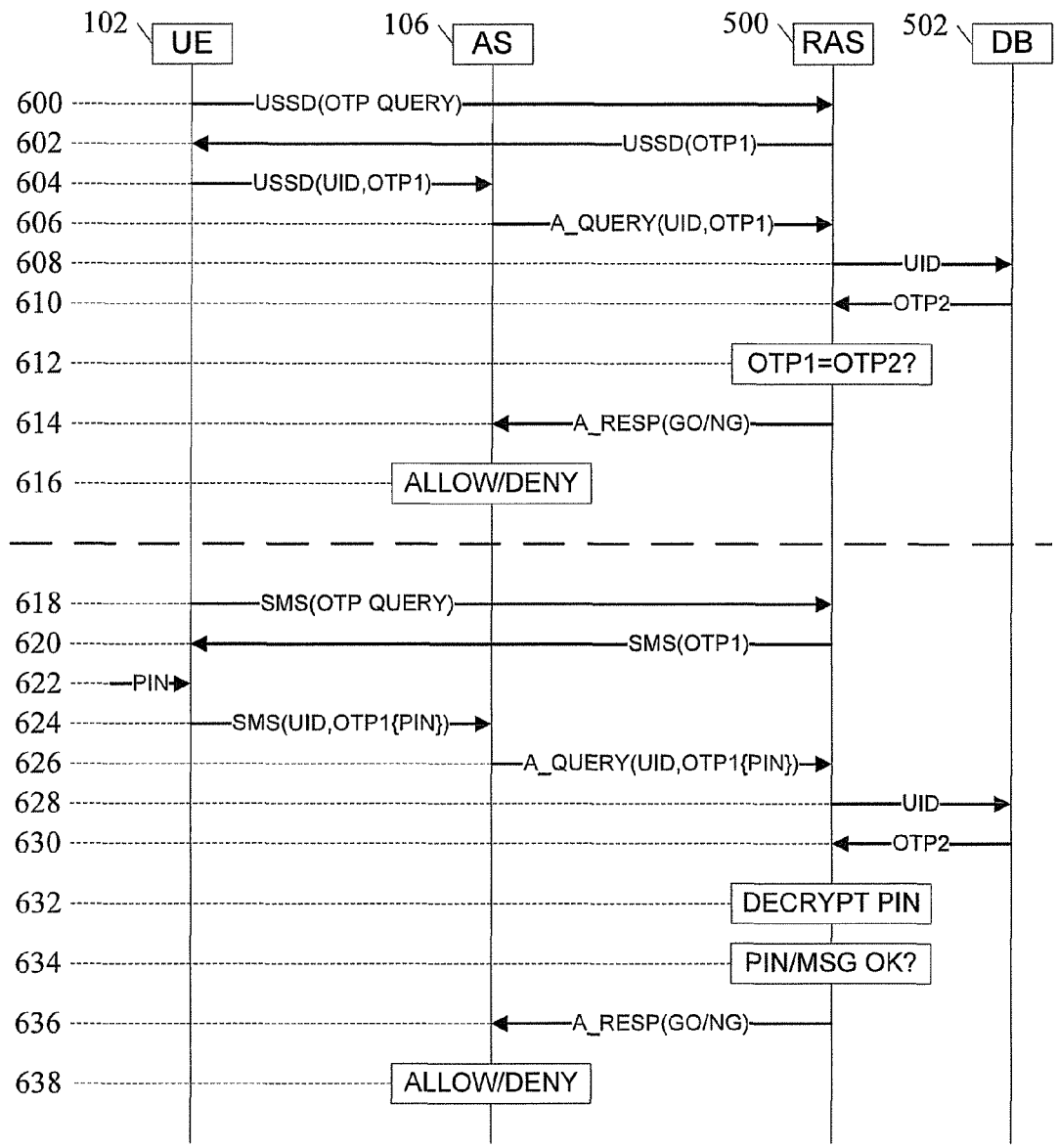
FIG. 6 is a signaling message flow diagram illustrating messages communicated during an exemplary process for application-level authentication in a telecommunications network according to yet another embodiment of the subject matter described herein.

FIG. 6 is a signaling message flow diagram illustrating messages communicated during an exemplary process for application-level authentication in a telecommunications network according to another embodiment of the subject matter described herein. In FIG. 6, the first authentication information is provided by an authentication information providing entity in the network, such as authentication server 108.

In one embodiment, the first authentication information associated with the sender of a message requiring authentication may be provided by a network entity rather than a locally communicatively coupled entity such as a fob. Message 600 is a message sent from device 102 to RAS 500 requesting first authentication information. Message 602 is a response message sent from RAS 500 to device 102 and containing the first authentication information, which in this example is a one time password, OTP1. Message 604 is the message requiring authentication sent from device 102 to node 106. In one embodiment, messages 600, 602, and 604 may be USSD messages. In alternative embodiments, these messages may be SMS messages, multimedia messaging service messages, instant messages, or application-specific messages, such as HTML messages, XML messages, and SOAP messages. The descriptions of items 606, 608, 610, 612, 614, and 616, are the same as for messages 508, 510, 512, 514, 516, and 518, respectively, and will not be repeated herein.

In another embodiment, the first authentication information may be a combination of information received from an authentication information providing entity and other information provided by the user. Message 618 is a message sent from device 102 to RAS 500 requesting first authentication information. Message 620 is a response message sent from RAS 500 to device 102 and containing the first authentication information, which in this example is a one time password, OTP1. As stated above, the first authentication information returned by RAS 500 may take other forms, and is not limited to one time passwords.

Message 622 contains additional first authentication information provided by the user, such as a PIN, an account number, another password, etc. The first authentication information may be incorporated into a message requiring authentication 624 sent from device 102 to node 106. For example, message 624 may include a payload containing the user's PIN encrypted using OTP1 as an encryption key or parameter. Upon receipt of message 624, node 106 may generate an A_QUERY 626 including the information identifying the sender of the message requiring authentication 624 UID and the encrypted payload OTP1{PIN}. RAS 500 may use the UID or other information identifying the sender to retrieve second authentication information associated with the sender OTP2 from authentication database DB 502 (messages 628 and 630), and use OTP2 to attempt to decrypt the encrypted payload OTP1{PIN} (block 632). If the decryption is successful, e.g., generating a valid PIN or message (block 634), RAS 500 may send an A_RESP message 636 indicating a "GO". If the decryption is unsuccessful, or if the resulting PIN or message is invalid, RAS 500 may send an A_RESP message 636 indicating a "NG". In block 638, node 106 may allow or deny the requested transaction based on the results of the authentication operation.

In one embodiment, the message requiring authentication may be a request for a transaction. In this scenario, the result of authentication will determine whether or not the requested transaction will be allowed. In alternate embodiments, the message requiring authentication may be of a nature such that the result of authentication informs other determinations, such as whether or not the message will be delivered to its destination, whether or not the contents of the message will be recorded (e.g., in an event log), whether or not the sender or receiver of the message will be billed for the message, etc. For example, an unauthorized message may be allowed to proceed but may cause a higher level of scrutiny to be given to subsequent messages from that sender.

Figure 7:
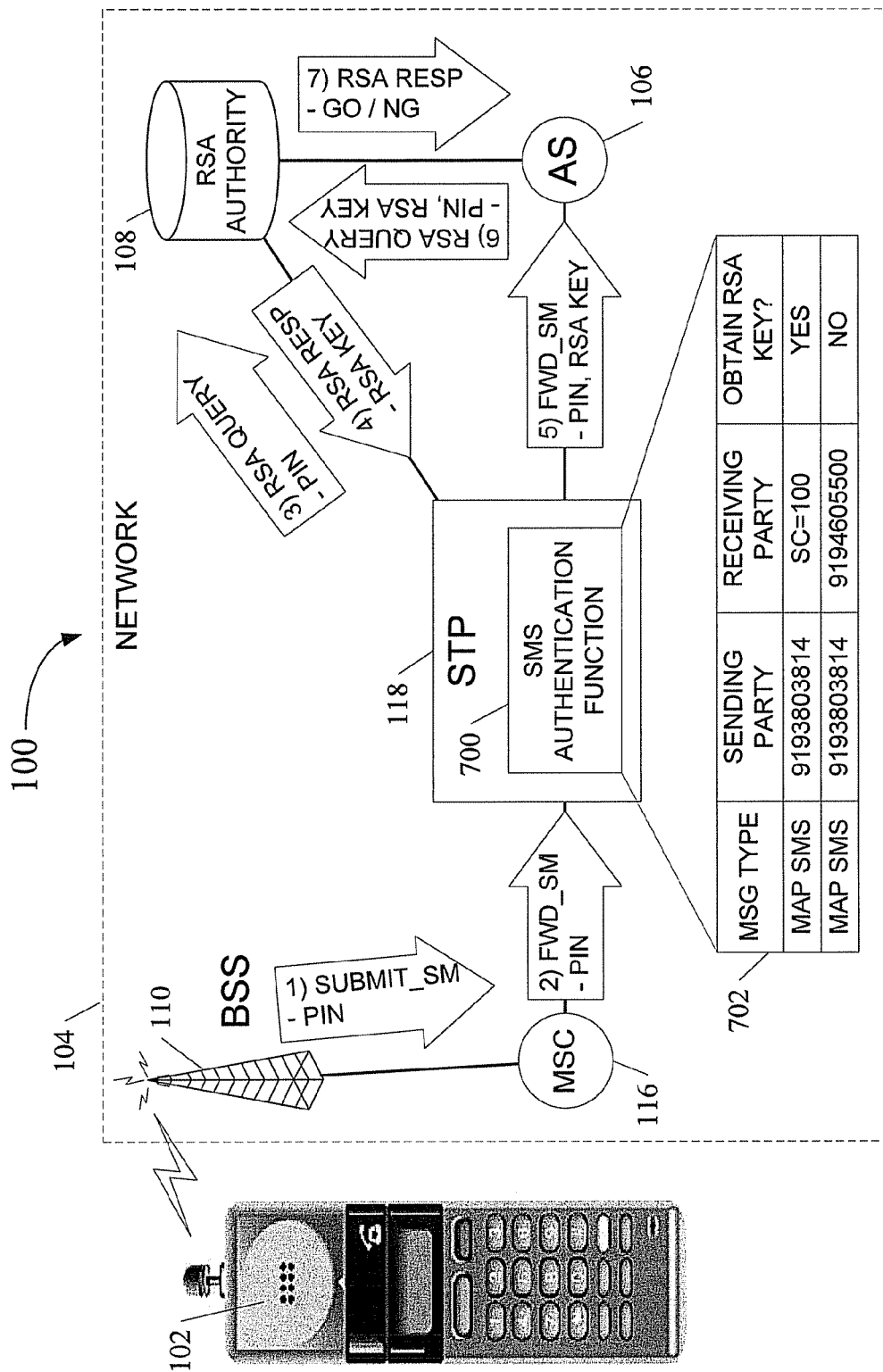
FIG. 7 is a block diagram illustrating an exemplary system for application-level authentication in a telecommunications network according to yet another embodiment of the subject matter described herein.

FIG. 7 is a block diagram illustrating an exemplary system for application-level authentication in a telecommunications network according to another embodiment of the subject matter described herein. In one embodiment, an SMS application on device 102 initiates an SMS transaction on application server node 106 by sending a message directed toward node 106. For example, device 102 may send an SMS message, which enters network 104 via air interface 110. Air interface 110 sends a Submit_SM message (FIG. 7, message 1) to gateway 116. Gateway 116 sends a Forward_SM message (FIG. 7, message 2) to node 106 via signal routing node 118. The descriptions of the following items are the same as for FIG. 1, and will not be repeated herein: device 102, network 104, air interface 110, node 106, gateway 116, signal routing node 118, and authentication server 108.

In one embodiment, signal routing node 118 includes a triggerless SMS authentication function 700, which intercepts messages, determines whether a message requires authentication, and if so, performs an authentication function. SMS authentication function 700 may maintain a table, database, data structure, or other data store which it may use to determine whether a message requires authentication. In one embodiment, SMS authentication function 700 may maintain an authentication table 702 for determining whether authentication is required for a particular message based on message characteristics, such as message type, sending party ID, receiving party ID, and so forth. For example, SMS authentication function 700 may intercept the Forward_SM message, determine that the message type is a mobile application part (MAP) SMS message, that the directory number of the party sending the message is "9193803814" and that directory number of the receiving party is a short code, SC=100. SMS authentication function 700 may use these and/or any other message characteristic to perform a lookup into authentication table 702. In this example, SMS authentication function 700 may find a matching entry in authentication table 702 and determine that authentication is required (e.g., the value of the "Obtain RSA Key" field in authentication table 702="YES"). If SMS authentication function 700 determines that the message requires authentication, SMS authentication function 700 may send a query message (FIG. 7, message 3) to authentication server 108. The query message may include information identifying the sender of the message, such as the user's PIN.

In one embodiment, authentication server 108 may be an RSA Authority, which may send a query response (FIG. 7, message 4) to SMS authentication function 700. The response may include first authentication information associated with the sender, such as an RSA key. SMS authentication function 700 may then insert the first authentication information, i.e., the RSA key, to the original Forward_SM message, and forward the modified Forward_SM message to node 106 (FIG. 7, message 5). Alternatively, SMS authentication function 700 may create a new Forward_SM message (FIG. 7, message 5) including some information from the original Forward_SM message (FIG. 7, message 2) plus the first authentication information (the RSA key), and send the new message to node 106.

Upon receipt of the Forward_SM message from SMS authentication function 700, node 106 may extract the first authentication information, such as the PIN and RSA key, and send an authorization query (FIG. 7, message 6) to authentication server 108. Authentication server 108 may send an authentication response message (FIG. 7, message 7) to node 106. For example, authentication server 108 may use the PIN to retrieve the RSA key associated with the sender and compare the RSA key retrieved to the RSA key included in the authentication query (FIG. 7, message 6). If the RSA keys match, authentication server 108 may send an authentication response (FIG. 7, message 7) indicating authentication success; else the authentication response may indicate failure to authenticate.

Figure 8:
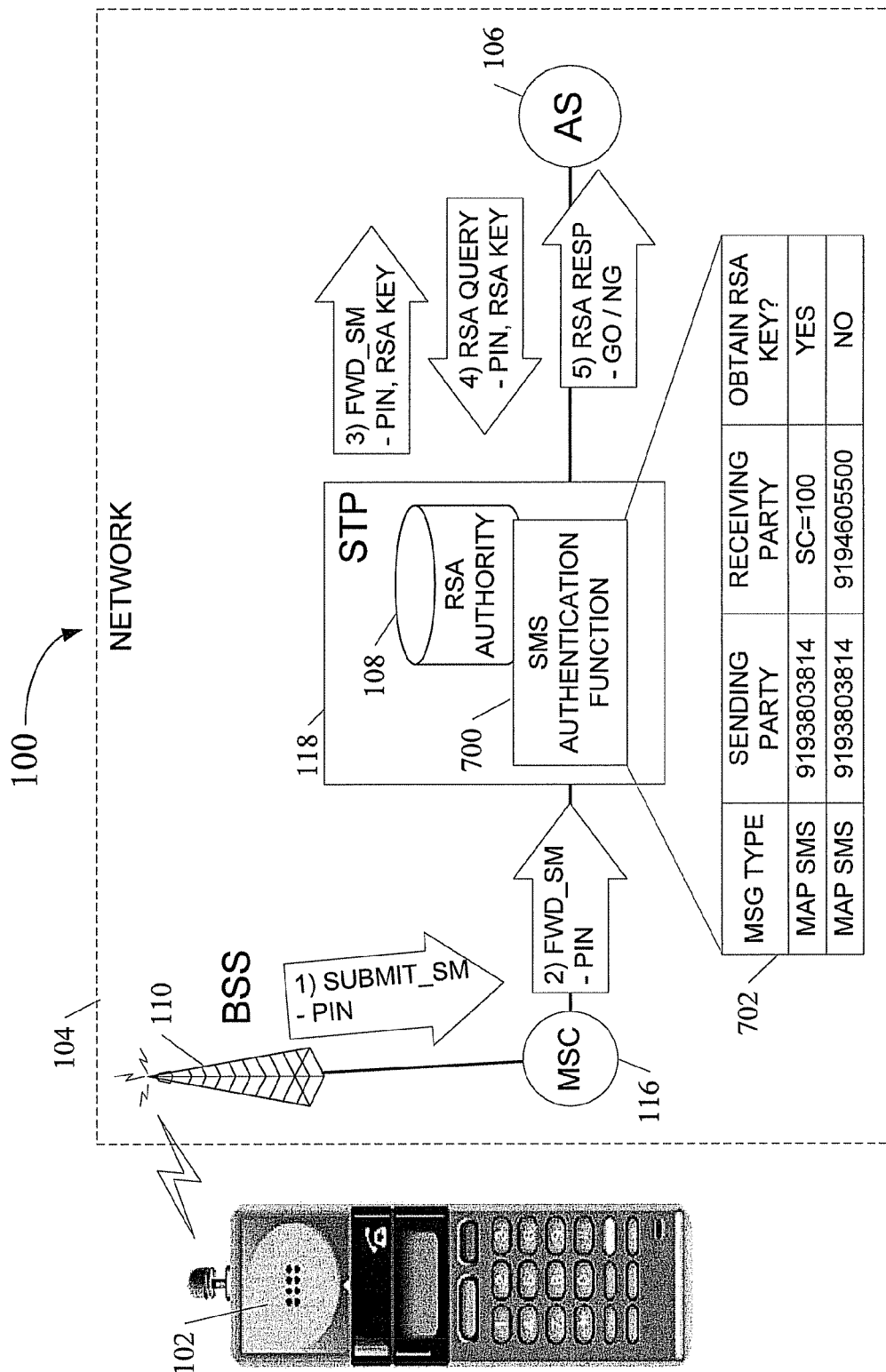
FIG. 8 is a block diagram illustrating an exemplary system for application-level authentication in a telecommunications network according to yet another embodiment of the subject matter described herein.

FIG. 8 is a block diagram illustrating an exemplary system for application-level authentication in a telecommunications network according to yet another embodiment of the subject matter described herein. The embodiment illustrated in FIG. 8 is essentially identical to the embodiment illustrated in FIG. 7, except that authentication server 108 is co-located within signal routing node 118, such as an STP. The initial RSA query and response shown in FIG. 7, messages 3 and 4, may, in FIG. 8, occur as operations internal to signaling message routing node 118, rather than messages that are communicated across the network between two entities, as shown in FIG. 7. The descriptions for messages 3, 4, and 5 in FIG. 8 are identical to the descriptions for messages 5, 6, and 7 in FIG. 7, respectively, and will not be repeated herein.

In alternate embodiments, authentication server 108 could be co-located or integrated with another entity on the network. For example, authentication server 108 could be co-located with an SMS gateway, a USSD gateway, a session initiation protocol (SIP) server, a call session control function (CSCF) node, a signaling gateway, or other entity that processes messages in a telecommunications network.

Figure 9:
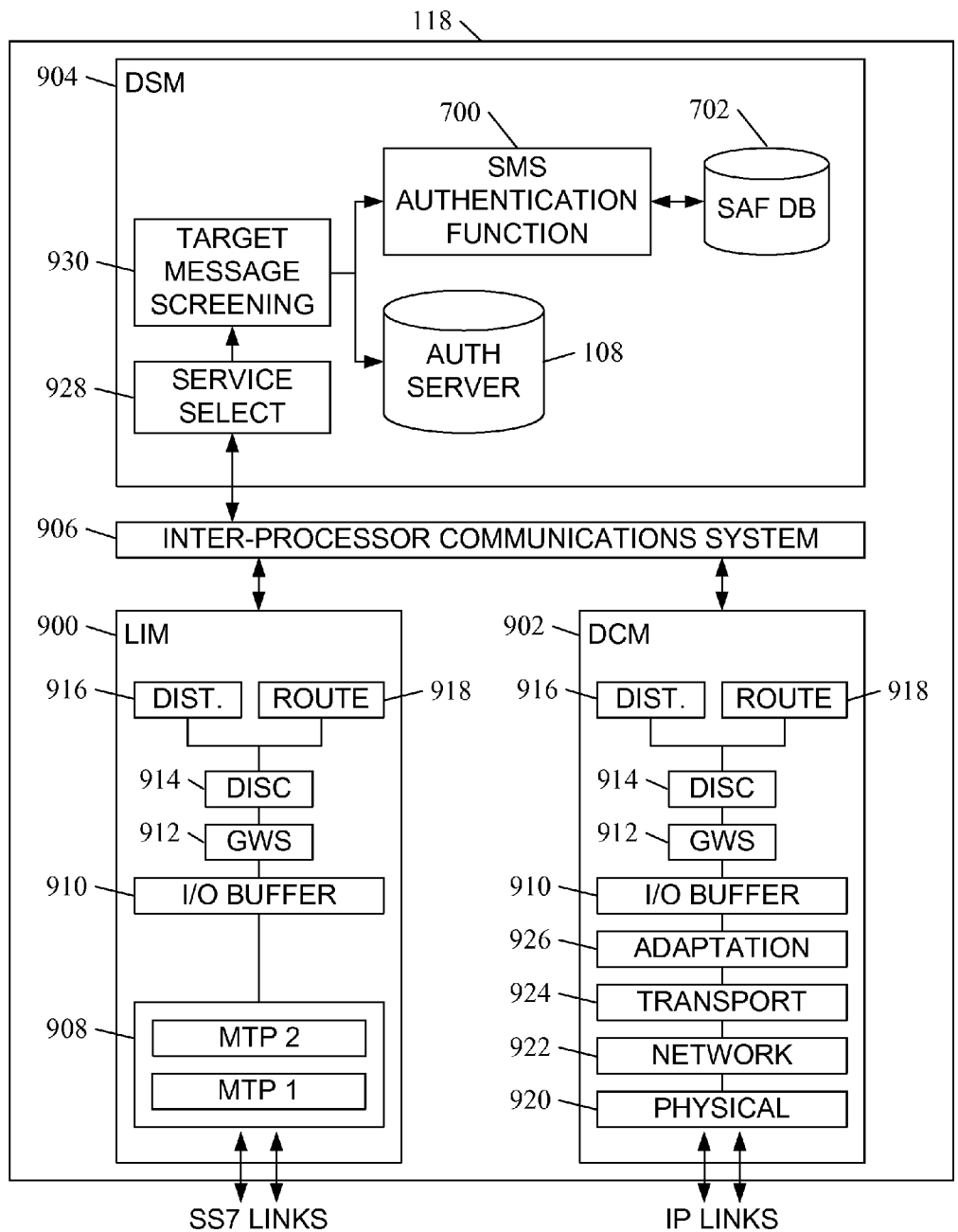
FIG. 9 is a block diagram illustrating an exemplary signaling message routing node for providing application-level authentication according to yet another embodiment of the subject matter described herein.

FIG. 9 is a block diagram illustrating an exemplary signaling message routing node for providing application-level authentication according to an embodiment of the subject matter described herein. In one embodiment, signaling message routing node 118 may be a signal transfer point (STP). Signaling message routing node 118 may include a link interface module (LIM 900), a data node (DCM 902), and a database services module (DSM 904). Each module LIM 900, DCM 902, and DSM 904 may include a printed circuit board, an application processor for performing application level processing of signaling messages, and a communications processor for controlling inter-processor communications via an inter-processor communications system 906. Inter-processor communications system 906 may be any suitable mechanism for providing message communication between processing modules LIM 900, DCM 902, and DSM 904. For example, inter-processor communications system 906 may be a bus, an Ethernet LAN, or any other suitable mechanism for providing communications between processors.

LIM 900 includes various functions for sending and receiving signaling messages over SS7 signaling links. In the illustrated example, LIM 900 includes a message transfer part (MTP) level 1 and 2 function 908, an I/O buffer 910, a gateway screening (GWS) function 912, a discrimination function 914, a distribution function 916, and a routing function 918. MTP level 1 and 2 function 908 performs MTP level 1 and 2 functions, such as error detection, error correction, and sequencing of signaling messages. I/O buffer 910 stores inbound signaling messages before the messages are processed by higher layers. I/O buffer 910 also stores outbound signaling messages waiting to be transmitted over a signaling link by MTP level 1 and 2 function 908. Gateway screening function 912 screens inbound signaling messages based on destination point code and, optionally, based on originating point code to determine whether the messages should be allowed into the network. Discrimination function 914 analyzes the destination point code in each received signaling message to determine whether the signaling message should be processed by an internal processing module within node 102 or whether the message should be routed over an outbound signaling link. Discrimination function 914 forwards messages that are to be internally processed to distribution function 916. Discrimination function 914 forwards messages that are to be routed over an outbound signaling link to routing function 918.

Distribution function 916 distributes messages that are identified as requiring internal processing to the appropriate internal processing module. For example, distribution function 916 may forward SCCP messages to database services module 904 for SCCP processing. Routing function 918 routes signaling messages that are addressed to point codes other than the point code of node 102. For example, routing function 918 may forward messages to another link interface module (not shown in FIG. 9) or to data node 902 for transmission over an outbound signaling link.

DCM 902 includes various functions for sending and receiving SS7 messages over IP signaling links. In FIG. 9, these functions include a physical layer function 920, a network layer function 922, a transport layer function 924, an adaptation layer function 926, and SS7 MTP functions 910-918 as described with regard to LIM 900. Physical layer function 920 may be any suitable physical layer function for sending and receiving frames that encapsulate network layer packets. In one exemplary implementation, physical layer function 920 may be implemented using an Ethernet transceiver. Network layer function 922 may be implemented using Internet protocol, such as IPv4 or IPv6. Transport layer function 924 may be implemented using any suitable transport layer protocol. Examples of transport protocols suitable for use with embodiments of the subject matter described herein include user datagram protocol (UDP), transmission control protocol (TCP), and stream control transmission protocol (SCTP). Adaptation layer function 926 may be implemented using any suitable adaptation layer for sending SS7 messages over IP. Examples of adaptation layers suitable for use with the subject matter described herein include M3UA, M2PA, SUA, and TALI, as described in the correspondingly named IETF Internet drafts and RFCs. The remaining functions of DCM 902 are the same as those described with regard to LIM 900. Hence, a description thereof will not be repeated herein.

DSM 904 includes various functions and databases for processing signaling messages. In the illustrated example, DSM 904 incorporates the SMS authentication function 700 and associated authentication table 702, and also the functions of authentication server 108.

Service selection function 928 receives messages from the interface processors and determines the type of service required for each message. For example, service selection function 928 may determine whether further screening of messages is required or whether the messages are simply to be global title translated and routed. In one embodiment, service selection function 928 may forward all CAP, INAP, SMS, or USSD messages to target message screening function 930. For example, target message screening function 930 may identify CAP or INAP queries as potentially needing to be directed to authentication server 108. Similarly, target message screening function 930 may identify SMS or USSD messages as targeted message types that should be directed to SMS authentication function 700 to determine whether the message requires authentication. The functions of authentication server 108 and SMS authentication function 700 are described above, and will not be repeated herein.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for application-level authentication of messages in a telecommunications network, the method comprising:

at a node in a telecommunications network:
receiving, from a personal communications device having a user, a short message service (SMS) message or an unstructured supplementary service data (USSD) message requiring application-level authentication, the message including identification information associated with the user and incorporating first authentication information associated with the user, the first authentication information being provided from an information source that is not the user of the personal communications device and comprising at least one of a personal identification number, a password, a one-time password, an encryption key, and an encryption parameter;
  wherein the first authentication information incorporated into the message received from the personal communications device comprises at least one of first authentication information provided to the personal communications device in response to a message sent from the personal communications device to a destination identified by at least one of a telephone number and a short code, and first authentication information provided by an authentication information provisioning module that is communicatively coupled to the device, wherein providing the first authentication information by the authentication information provisioning module includes requesting authentication information from a fob for generating one-time passwords and receiving from the fob a one-time password as the first authentication information;
  extracting the identification information associated with the user and generating a request for second authentication information, wherein the request includes the extracted identification information;
  sending the request for second authentication information to an authentication server;
  receiving, from the authentication server, the second authentication information associated with the user; and
  determining the authenticity of the message based on the second authentication information associated with the user by determining that the second authentication information received from the authentication server matches the first authentication information from the information source.

2. The method of claim 1 wherein the node comprises one of an application server (AS), a session initiation protocol (SIP) application server, a service control point (SCP), a home location register (HLR), a visitor location register (VLR), a gaming server, an on-line gaming server, a multi-player networked game server, an interactive gaming application, a mobile switching center (MSC), a service switching point (SSP), a signal transfer point (STP), a call session control function (CSCF) node, and an Internet protocol multimedia subsystem (IMS) node.

3. The method of claim 1 wherein the identification information associated with the user includes at least one of a personal identification number (PIN), a username, an international mobile subscriber identity (IMSI), a mobile subscriber ISDN (MSISDN) identifier, a mobile identification number (MIN) identifier, a uniform resource identifier (URI), and a directory number associated with the user.

4. The method of claim 1 wherein the second authentication information includes at least one of a personal identification number, a password, a one-time password, an encryption key, an encryption parameter, an indication that the message is authentic, and an indication that the message is not authentic.

5. The method of claim 1 wherein receiving the message incorporating the first authentication information comprises at least one of receiving a message containing at least a portion of the first authentication information and receiving a message wherein at least a portion of the message is encrypted using at least a portion of the first authentication information.

6. The method of claim 1 wherein the second authentication information includes an authentication response indicating the authenticity of the message, and wherein determining the authenticity of the message includes determining the authenticity of the message based on the authentication response indicating the authenticity of the message.

7. The method of claim 1 wherein determining the authenticity of the message includes making the determination based on a comparison of the first authentication information and the second authentication information.

8. A method for application-level authentication of messages in a telecommunications network, the method comprising:
  at a personal communications device for communicating with a telecommunications network:
    receiving, from an authentication information source that is not a user of the personal communications device, first authentication information associated with the user and comprising at least one of a personal identification number, a password, a one-time password, an encryption key, and an encryption parameter;
    wherein receiving the first authentication information comprises at least one of sending a message to a short code and receiving the first authentication information in response to the message sent to the short code, and receiving the first authentication information from an authentication information providing entity that is locally communicatively coupled to the personal communications device;
    wherein receiving the first authentication information from the authentication information providing entity includes requesting authentication information from a fob for generating one-time passwords and receiving from the fob a one-time password as the first authentication information;
    sending, to an authentication server, a request for second authentication information, the request including information identifying the user, and receiving, from the authentication server, the second authentication information associated with the user;
    sending a short message service (SMS) message or an unstructured supplementary service data (USSD) message requiring application-level authentication, the message including identification information associated with the user and incorporating the first and second authentication information for use by a receiver of the message to authenticate the message; and
    receiving confirmation that the message is authentic based upon a determination that the first authentication information matches the second authentication information.

9. The method of claim 8 wherein the personal communications device comprises one of a mobile phone, a personal digital assistant (PDA), and a mobile computing device.

10. The method of claim 8 wherein sending the message incorporating the first and second authentication information comprises at least one of sending a message containing at least a portion of the authentication information and sending a message wherein at least a portion of the message is encrypted using at least a portion of the authentication information.

11. A system for application-level authentication of messages in a telecommunications network, the system comprising:
  a personal communications device configured for sending a short message service (SMS) message or an unstructured supplementary service data (USSD) message requiring application-level authentication in a telecommunications network, the message including identification information associated with a user of the personal communications device and incorporating first authentication information associated with the user, the first authentication information being provided from an information source that is not the user of the personal communications device and comprising at least one of a personal identification number, a password, a one-time password, an encryption key, and an encryption parameter;

wherein the first authentication information being provided comprises at least one of sending a message to a short code and receiving the first authentication information in response to the message sent to the short code, and an authentication information providing entity that is locally communicatively coupled to the personal communications device and wherein the personal communications device is configured to receive, prior to sending the message requiring application-level authentication, the first authentication information from the authentication information providing entity, wherein the personal communications device is configured to receive the first authentication information from the fob by sending a request for a one-time password to the fob, and wherein the fob is configured to provide to the personal communications device a one-time password in response to the request;

a node in the telecommunications network configured for receiving the message requiring application-level authentication and for sending, in response to receiving the message, a request for second authentication information associated with the user, wherein the node in the telecommunications network extracts the identification information associated with the user and generates a request for second authentication information, wherein the request includes the extracted identification information; and an authentication server for receiving the request for second authentication information, and, in response to receiving the request, providing, to the node, the second authentication information associated with the user;

wherein the node, upon receiving the second authentication information, determines the authenticity of the message requiring application-level authentication based on a determination that the second authentication information received from the authentication server matches the first authentication information from the information source.

12. The system of claim 11 wherein the personal communications device comprises one of a cell phone, a personal digital assistant (PDA), and a mobile computing device.

13. The system of claim 11 wherein the message requiring application-level authentication comprises at least one of a message containing at least a portion of the first authentication information and a message wherein at least a portion of the message is encrypted using at least a portion of the first authentication information.

14. The system of claim 11 wherein the first authentication information comprises a one-time password and wherein the one-time password comprises one of a password that automatically becomes invalid after a predetermined amount of time and a password that remains valid until it is used.

15. The system of claim 11, wherein the information source that provides the first authentication information provides a one-time password, and wherein the information source that provides the first authentication information generates a new one-time password at least one of periodically and upon receiving a request for a new password from the personal communications device.

16. The system of claim 11 wherein the personal communications device is configured to receive, prior to sending the message requiring application-level authentication, the first authentication information from the authentication server.

17. The system of claim 11, wherein the authentication information providing entity provides a one-time password, and wherein the authentication information providing entity generates a new one-time password at least one of periodically and upon receiving a request for a new password from the personal communications device.

18. The system of claim 11 wherein the node comprises one of an application server (AS), a session initiation protocol (SIP) application server, a service control point (SCP), a home location register (HLR), a visitor location register (VLR), a gaming server, an on-line gaming server, a multi-player networked game server, an interactive gaming application, a mobile switching center (MSC), a service switching point (SSP), a signal transfer point (STP), a call session control function (CSCF) node, and an Internet protocol multimedia subsystem (IMS) node.

19. The system of claim 11 wherein the identification information associated with the user includes at least one of a personal identification number (PIN), a username, an international mobile subscriber identity (IMSI), a mobile subscriber ISDN (MSISDN) identifier, a mobile identification number (MIN) identifier, a uniform resource identifier (URI), and a directory number associated with the user.

20. The system of claim 11 wherein the second authentication information includes at least one of a personal identification number, a password, a one-time password, an encryption key, an encryption parameter, an indication that the message is authentic, and an indication that the message is not authentic.

21. The system of claim 11 wherein the personal communications device is communicatively coupled to an authentication information provisioning module for providing the first authentication information.

22. The system of claim 11 wherein the second authentication information includes an authentication response indicating the authenticity of the message, and wherein the node determines the authenticity of the message requiring application-level authentication based on the authentication response indicating the authenticity of the message.

23. The system of claim 11 wherein the node determines the authenticity of the message requiring application-level authentication based on a comparison of the first authentication information and the second authentication information.

24. An apparatus for performing application-level authentication of messages, the apparatus comprising:
    an authentication information module for providing first authentication information comprising at least one of a personal identification number, a password, a one-time password, an encryption key, and an encryption parameter;
    a personal communications device, locally communicatively coupled with the authentication information module, for communicating with a telecommunications network and for receiving the first authentication information from the authentication information module, generating a short message service (SMS) message or an unstructured supplementary service data (USSD) message requiring application-level authentication and incorporating the first authentication information for use by a receiver of the message to authenticate the message, and sending the generated message;
  wherein receiving the first authentication information comprises at least one of sending a message to a short code and receiving the first authentication information in response to the message sent to the short code, and requesting authentication information from a fob for generating one-time passwords and receiving from the fob a one-time password as the first authentication information, wherein the authentication information module comprises a device and the fob;
wherein the authentication information module is not a user of the personal communications device;
wherein the personal communications device is configured to communicate with a node in a telecommunication network configured to generate a request for second authentication information, wherein the request includes extracted identification information that is sent to an authentication server, and wherein the node determines the authenticity of the message based on the first and second authentication information associated with the user by determining that the second authentication information received from the authentication server matches the first authentication information from the authentication information module.

25. The apparatus of claim 24 wherein the first authentication information one of remains valid for a predetermined period of time after generation and remains valid until use.

26. The apparatus of claim 24 wherein the generated message incorporating the first authentication information comprises at least one of a message containing at least a portion of the authentication information and a message at least a portion of which is encrypted using at least a portion of the authentication information.

27. The apparatus of claim 24 wherein the authentication information module at least one of generates new first authentication information periodically and generates new first authentication information upon receiving a request to provide authentication information.

28. The apparatus of claim 24 wherein the first authentication information is generated using an algorithm based on information associated with at least one of a user of the personal communications device, the authentication information module, the personal communications device, the time that the message is generated, the date on which the message is generated, the geographic location of the personal communications device, a network with which the personal communications device is communicating, a provider of an application existing on the personal communications device, and information provided by the user at the time that the message is generated.

29. The apparatus of claim 24 wherein the first authentication information provided by the authentication information module is specific to at least one of a network provider, a network carrier, an application, an application provider, and a third-party.

30. The apparatus of claim 24 wherein the personal communications device comprises at least one of a mobile phone, a personal digital assistant (PDA), and a mobile computing device.

31. The apparatus of claim 24 wherein the personal communications device locally communicatively coupled with the authentication information module comprises the device and fob communicating via a physical connection.

32. The apparatus of claim 31 wherein the physical connection comprises at least one of an RS-232 connection, a serial bus, a parallel bus, a universal serial bus (USB) connection, a firewire connection, and a ethernet connection.

33. The apparatus of claim 24 wherein the personal communications device locally communicatively coupled with the authentication information module comprises the device and fob communicating via a wireless connection.

34. The apparatus of claim 33 wherein the wireless connection comprises a Bluetooth connection.

35. A non-transitory computer readable medium having stored thereon computer-executable instructions that when executed by the processor of a computer perform steps comprising:
  at a node in a telecommunications network:
    receiving, from a personal communications device having a user, a short message service (SMS) message or an unstructured supplementary service data (USSD) message requiring application-level authentication, the message including identification information associated with the user and incorporating first authentication information associated with the user, the first authentication information being provided from an information source that is not the user of the personal communications device and comprising at least one of a personal identification number, a password, a one-time password, an encryption key, and an encryption parameter;
    wherein the first authentication information incorporated into the message received from the personal communications device comprises at least one of first authentication information provided to the personal communications device in response to a message sent from the personal communications device to a destination identified by at least one of a telephone number and a short code, and first authentication information provided by an authentication information provisioning module that is communicatively coupled to the device, wherein providing the first authentication information by the authentication information provisioning module includes requesting authentication information from a fob for generating one-time passwords and receiving from the fob a one-time password as the first authentication information;
    extracting the identification information associated with the user and generating a request for second authentication information, wherein the request includes the extracted identification information;
    sending the request for second authentication information to an authentication server;
    receiving, from the authentication server, the second authentication information associated with the user; and
    determining the authenticity of the message based on the second authentication information associated with the user by determining that the second authentication information received from the authentication server matches the first authentication information from the information source.

* * * * *